DYNAMOELECTRIC MACHINE WINDING ARRANGEMENT

Filed Nov. 20, 1951 2 SHEETS—SHEET 1

Inventors:
John E. McElligott,
Dean B. Harrington,
by Richard E Hosley
Their Attorney.

DYNAMOELECTRIC MACHINE WINDING ARRANGEMENT

Filed Nov. 20, 1951 2 SHEETS—SHEET 2

Inventors:
John E. McElligott,
Dean B. Harrington,
by Richard E. Hosley
Their Attorney.

Patented Mar. 3, 1953 2,630,541

UNITED STATES PATENT OFFICE 2,630,541

DYNAMOELECTRIC MACHINE WINDING ARRANGEMENT

John E. McElligott, Schenectady, and Dean B. Harrington, Scotia, N. Y., assignors to General Electric Company, a corporation of New York Application November 20, 1951, Serial No. 257,234

12 Claims. (Cl. 310—198)

1

Our invention relates to dynamoelectric machine windings and has significance in connection with an improved armature winding pattern for a multiple winding alternating current dynamoelectric machine such as a two winding turbine generator.

In the past there has been provided a type of A. C. generator having electrically independent armature windings. A turbine generator having two electrically independent armature windings has certain advantages associated with the switching and transformer arrangements in a power station, eliminating the need for reactors and other expensive equipment since the double winding generator stator can itself act as a transformer to allow interchange of power between otherwise independent electrical power systems and at the same time to limit values of fault current during short circuit. In the past, however, there has been a considerable problem in connection with the physical arrangement of the two windings with respect to one another. Among the arrangements heretofore proposed has been that of placing similar phases of both windings in the same slots as suggested in Patent 1,815,823, granted July 21, 1931, upon application of T. F. Barton and assigned to the assignee of the present invention; that of placing the two windings under alternate poles; that of placing the two windings in alternate slots as shown in Reissue Patent 19,433, granted January 22, 1935, upon application of D. D. Chase and assigned to the assignee of the present invention; and that of the so called double split phase belt winding arrangement shown in Patent 2,046,992 granted July 7, 1936, upon application of P. L. Alger and assigned to the assignee of the present invention.

In many present day installations none of the above arrangements are entirely satisfactory. The Barton arrangement of different windings in the same slots has the disadvantage of a very low through reactance and consequently inadequate protection against short circuits. The alternate pole arrangement is characterized by the disadvantage of a too high vibration when the two windings carry unequal current. The Chase alternate slot arrangement is characterized by the disadvantage of an often unpermissibly low through reactance when saturation is present.

In the above-mentioned Alger patent it was proposed to obtain an optimum value of through reactance by dividing each phase belt into groups of slots and assigning one group to each winding. According to nomenclature defined in the Alger patent, the term phase belt is used to designate

2 the groups of conductors of the different windings belonging to one phase and corresponding to one pole. For a two winding machine, each phase belt was, according to Alger, sub-divided into two groups. Since in the past the only multiple winding machines related to this general problem have been two winding machines, the name "double split phase belt" is currently used to characterize the Alger arrangement. In some applications this arrangement, usually characterized by the respective groups of sub-phase belts comprising equal numbers of conductors and involving equal numbers of slots, has been found to give undesirable production of air gap harmonic fluxes responsible for pole faces losses, which cause undesirable heating of the rotor surface, and responsible for objectionable vibration of the machine under unbalanced load in the two windings. Similarly other arrangements of different windings in alternate pairs or triplets of slots have been found not to satisfy the joint requirements of high saturated through reactance and low vibration with unbalanced loads on the two windings.

It is an object of the present invention to provide simple means for overcoming the above-mentioned difficulties.

Although the multiple windings of a multiple winding generator may be electrically independent, they are coupled magnetically. When a fault occurs on one winding, the magnetic coupling causes an increase in the magnitude of current of the faulted winding and an increase in magnitude of current in the unfaulted winding. This increase in currents is limited by the "through reactance" between windings. The fault currents act to saturate the magnetic paths of the armature, reducing the effective through reactance and, consequently, increasing the magnitude of the fault current. Therefore, rather than talking of normal through reactance, it is conventional to speak of "saturated through reactance" valves in discussing desirable qualities for a multiple winding dynamoelectric machine.

It is a further object of the present invention to provide a multiple winding arrangement which will fulfill the two-fold requirement of a high saturated through reactance between the windings during a fault on one of the windings, and of low harmonics of armature magnetomotive force when unequal currents flow in the windings.

A further object of the present invention is to provide a multiple winding dynamoelectric machine having a plurality of electrically independent, electrically and magnetically identical armature windings arranged always to provide a satisfactory through reactance, while the windings may be operated simultaneously as portions of independent electrical power systems or any winding may be operated alone without causing noticeable mechanical vibration or excessive heating of any portion of the dynamoelectric machine. By referring to windings which are electrically and magnetically identical, we mean to imply that the reactances of the two windings are equal and the generated voltages of the two windings are equal in magnitude and in phase so that the two windings could be coupled together either at the machine terminals or at a remote point without causing any circulating currents.

In accordance with one aspect of our invention, we provide an improvement on the Alger "double" split phase belt arrangement by providing a double winding machine having at least half of the phase belts each split into three or more sections at least one of which involves a different number of conductors (and slots) from those associated with at least one other section of the same phase belt. Through the use of such arrangements it has been found possible to provide satisfactory values of through reactance together with satisfactorily low pole face losses and negligible mechanical vibration under practically all conditions of operation.

Our invention will be better understood from the following description taken in connection with the accompanying drawing and its scope will be pointed out in the appended claims.

In the drawing, Fig. 1 shows a diagrammatic development of a single phase of a two layer armature winding arrangement for a three phase double winding generator having two poles and 42 slots, and this arrangement is also represented, for all three phases, by phase letter designations at the bottom of Fig. 1; Fig. 2 is a diagrammatic illustration, by way of phase letter designation, of a two layer armature winding arrangement for a double winding generator having four poles and 96 slots and the arrangement (for either layer) is further represented by an abbreviated notation in the bottom line of Fig. 2; Fig. 3 is a diagrammatic illustration, by way of the abbreviated notation, for a single layer of a two layer winding arrangement illustrating a modification; and Figs. 4 and 5 are diagrammatic illustrations, by way of the abbreviated notation, of a single layer of a two layer double winding arrangement illustrating other modifications. In each case, each winding is assumed to be a two layer lap winding with the conductors at opposite sides of the same coil occupying different layers within the slots of an associated magnetic core portion of the associated machine.

Referring to Fig. 1, we have here diagrammatically represented a two layer lap winding arrangement for a single phase of each of two windings provided for a slotted stator core 101 of a two pole, three phase alternator. Core 101 is provided with forty-two slots, numbered 1–42 in Fig. 1, and the two windings comprise a first winding having phases A, B, and C of which phase A is shown in light lines and a second winding having phases *a*, *b*, and *c* of which phase "*a*" is shown in heavy lines. For the "A" and "*a*" phases, the coil side in the top of each slot is shown solid and the coil side in the bottom of each slot is shown dashed. The other phases are not shown on the development but the arrangement of all phases of each winding will be apparent from the phase letter designations appearing at the bottom of Fig. 1 and in vertical alignment with the slots above.

From Fig. 1 it is seen that the two windings each comprise phases made up of coils with the opposite sides of each coil lying in different layers within the slots of core 101. For convenience, the double winding arrangement may be considered per layer according to phase belts each of which comprises the coil sides of the two windings belonging to similar phases and corresponding to one pole. Thus the first phase belt shown for the top layer as AA*aaa*AA, which may be expressed in a sort of abbreviated notation as 2A—3*a*—2A. It is obvious that this, and all other phase belts shown in Fig. 1, is broken into three sections and, therefore, the arrangement shown may be called a "triple split phase belt arrangement." These sections into which the phase belts are divided may be called sub-phase belts, each sub-phase belt comprising adjacent coil sides in a single layer belonging to a single phase of a single winding. In the drawings we have shown appropriate reversals between relative positions of capital with respect to small letter circuits (occurring every other phase in Fig. 1) which serve to keep the voltages in the two windings, considered over the machine as a whole, balanced and in phase. Except for such reversals the arrangement of Fig. 1 presents a uniform pattern (of 2—3—2) as between phase belts, and the pattern of each phase belt is one of unequal sub-phase belts one comprising only two coil sides, the next three coil sides, and the last two coil sides. The arrangement of the bottom layer is the same as that of the top, although the starting point is shifted to give a desirable pitch to the coils. With the arrangement shown, it is readily possible to select a pitch which will allow the accomplishment of all the desirable objects already recited by minimizing the number of slots carrying coil sides of different windings.

Referring now to Fig. 2 of the drawing, we have shown in tabular form a diagrammatic representation of a two layer winding arrangement for a four-pole, two winding, three-phase machine having 96 armature winding slots. The arrangement is indicated according to phase letter designations in the table occupying the upper nine lines of the figure and according to abbreviated notation (for one layer) on the bottom line thereof. It will be observed from Fig. 2 that the reversal of the position of corresponding phases is not every phase belt (or every pole for any one phase) as in Fig. 1, but occurs every third phase belt (i. e., every third pole for any one phase). However, even with the arrangement of Fig. 2, the generated voltages of the two windings will be exactly the same in magnitude and phase because the dissymmetry under the first two poles (considering similar phases of the two windings) is counterbalanced under the last two poles.

In Fig. 2 as in Fig. 1, we have shown the arrangement for a double winding machine having a uniform pattern of triple split phase belts, but one difference is that in the pattern of Fig. 1, the coil sides per phase belt per winding are unequal for the two windings, being 2 plus 2 compared to 3, while in the pattern of Fig. 2, the phase belts are split into sections of conductors which add up the same, i. e., 2 plus 2 compared to 4, but in either case the individual sub-phase belts are unequal to the extent that one sub-phase belt has more coil sides belonging to one winding than another sub-phase belt of the same phase belt has coil sides belonging to another winding.

In Fig. 3, we have shown a diagrammatic illustration by way of the abbreviated notation, for one layer of a two layer arrangement for a 4 pole, 78 slot, double-winding machine having a non-uniform pattern of 3—3; 2—3—2; 3—3; 2—3—2; etc. Such a mixed (in Fig. 3 mixed triple and double) split phase belt arrangement is useful in connection with so-called fractional slot machines in which the number of slots divided by the product of the number of poles and phases does not give a unitary number.

Fig. 4 is a shorthand representation for the pattern of one layer of a quadruple split phase belt double-winding machine having 2 poles and 48 slots, and having the uniform pattern of 1—3—3—1; 1—3—3—1; 1—3—3—1; etc.

Fig. 5 is a shorthand representation for the pattern of one layer of a triple-split phase belt, double-winding machine having 4 poles and 90 slots and having different patterns in the different phase belts; i. e., 2—4—2; 2—3—2; 2—4—2; etc. Like the arrangement of Fig. 3, the arrangement of Fig. 5 is useful in a fractional slot machine.

Figure 1:
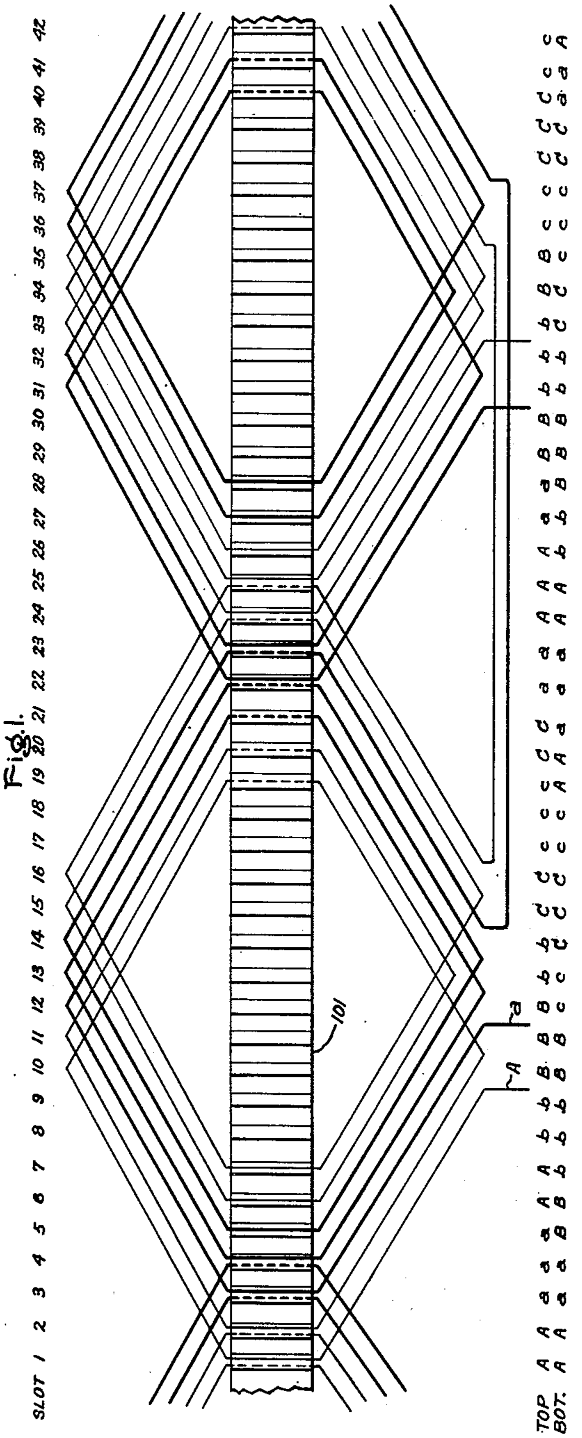

Each of the patterns of Figs. 1–5 are characterized by coil side groupings which provide appropriate reversals so that there is absolutely no difference in magnitude or phase between voltages produced in the corresponding phases of the multiple windings, and which also provide minimum harmonics when there is unbalanced loading. The equal voltages are obtained by providing arrangements which for any one phase of any one winding are different (e. g., reversed) in different phase belts, and the feature of minimum harmonics is achieved by not only making the arrangement under any one pole different for the different phase belts but also by making the number of sub-phase belts per phase belt greater than the number of windings and by making the number of coil sides per sub-phase belt unequal, at least throughout some of the phase belts.

From test results and values calculated or extrapolated therefrom, we have found it possible to compare the double-winding patterns of the prior art with the double winding patterns of Figs. 1–5, so that in view of present day performance criteria the comparison appears to be as follows:

| Pattern | Saturated Through Reactance | Pole Face Loss | Vibration |
|---|---|---|---|
| Similar Phases of Two Windings in Same Slots. | Prohibitively Low. | Low | Low. |
| Alternate Pole | Intermediate | Prohibitively High. | Prohibitively High. |
| Alternate Slot | Prohibitively Low. | Very Low | Low. |
| Double Split Phase Belt. | Very High | Intermediate to Prohibitively High. | Low to Prohibitively High. |
| Triple (or Higher) Split Phase Belt of Figs. 1–5. | High | Low | Low. |

The first four arrangements in the above tabulation cover substantially all heretofore known double winding arrangements, and none of them combine permissible values of through reactance with permissible values of pole face loss and vibration in view of requirements of the trade at the present time. The last line of the tabulation indicates such a desirable combination of permissible values for all three factors obtained in constructions which, in accordance with the present invention, are characterized by having at least one phase belt per phase per pair of poles split into sub-phase belts which are greater in number than the number of windings and with one or more of the sub-phase belts (of a phase belt so split) including a number of coil sides different from the number of coil sides of another sub-phase belt of the same phase belt. Thus, if the number of windings is "$n$," each (or some) of the phase belts have at least "$n+1$" sections alternately assigned to the different windings and the sections (or sub-phase belts) of phase belts so divided will be characterized by one of them having more coil sides (belonging to one winding) than another section of the same phase belt has coil sides (belonging to another winding).

One explanation of the advantages of the arrangement of the invention may be that the various patterns thereof substantially reduce the troublesome second harmonic (in a two-pole machine) and the troublesome one-half harmonic (in a four-pole machine) because of a uniformity of conductor distribution which is impossible to achieve if the phase belts are only split into a number of portions equal to the number of windings. While equal reduction of these harmonics can be achieved by placing the respective windings in alternate slots, such an arrangement produces values of leakage flux which make them undesirable from the standpoint of low saturated through reactance, as already explained. Uniformly placing the respective windings in alternate pairs (or triplets) of slots is not necessarily covered by the tabulation, but this amounts to making the sub-phase belts equal as regards the number of conductors they involve, and this has been found to result in excessive vibration for most applications.

It is apparent from the above that we have provided a device of the character described capable of meeting the objects hereinabove set forth. Unlike the arrangements heretofore known the invention satisfies not only the requirement of equal and in phase voltages between windings but the three-fold requirement of permissible values of through reactance, losses and vibration. Thus the invention enables the designer to construct a machine which may be loaded independently on a plurality of windings with low mechanical vibration and pole face loss and a high value of saturated through reactance.

Figure 2:
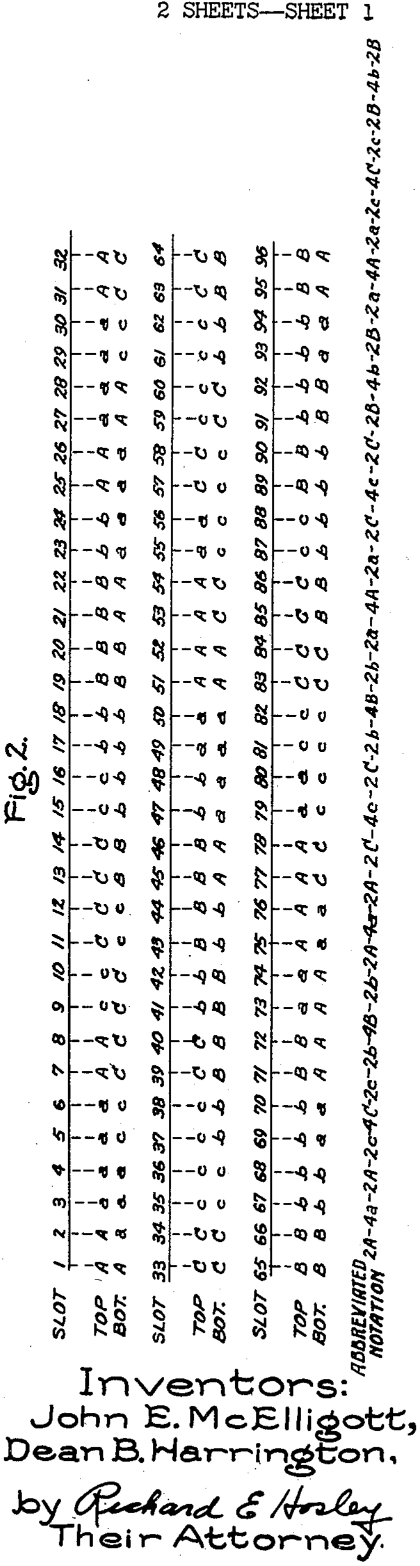
Figures 3, 4, 5:
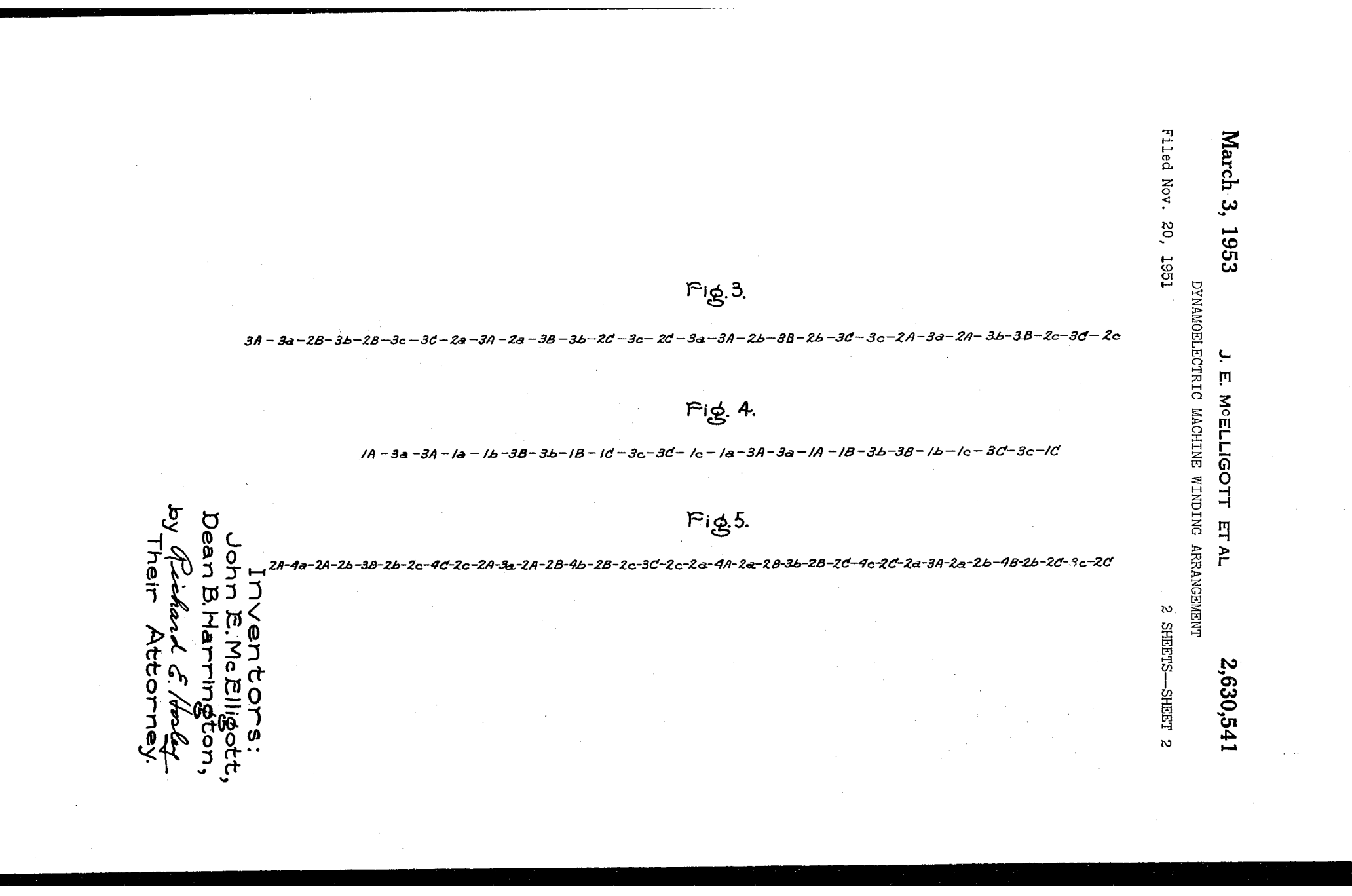

The invention is not limited to the particular embodiments illustrated and described, but the invention does cover both patterns in which each phase belt is similar to every other phase belt (disregarding reversals) as in Figs. 1, 2, and 4 and patterns in which there are different patterns in different phase belts, as in Figs. 3 and 5. The invention also covers patterns in which the sub-phase belts always reverse or alternate (from capital letter beginning to small letter beginning) between windings as in Figs. 1 and 3, and patterns in which this is not always the case as in Figs. 2, 4, and 5.

While we have shown and described particular embodiments of our invention, numerous modifications will be obvious to those skilled in the art. We desire it to be understood, therefore, that our invention is not to be limited to the arrangements disclosed and we intend in the appended claims to cover all such changes and modifications as fall within the true spirit and scope of our invention.

What we claim as new and desire to secure by Letters Patent of the United States is:

1. A winding arrangement for a polyphase dynamoelectric machine slotted magnetic member, said arrangement comprising $n$ electrically independent magnetically and electrically identical polyphase windings comprising coil sides arranged in the slots of said member to form phase belts with each phase belt comprising the number of conductors per layer per phase per pole, and with at least half the phase belts divided into at least $n+1$ sections alternately assigned to the different windings.

2. A winding arrangement for a polyphase dynamoelectric machine slotted magnetic member, said arrangement comprising $n$ electrically independent magnetically and electrically identical distributed multipolar windings comprising coil sides arranged in layers in the slots of said member to form one phase belt per phase per pole and having at least half of said phase belts divided into at least $n+1$ sub-phase belts at least one of which has more coil sides belonging to one winding than another subphase belt of the same phase belt has coil sides belonging to another winding.

3. In armature slots of a dynamoelectric machine, a double layer winding arrangement having two electrically independent, electrically and magnetically identical three-phase armature windings, said arrangement comprising a plurality of phase belts of the two windings with each phase belt comprising a plurality of sub-phase belts alternately assigned to the respective windings, with the plurality of sub-phase belts per phase belt averaging more than two and with at least half of the phase belts having the number of slots unequally divided among the sub-phase belts, whereby with appropriate reversals the corresponding generated phase voltages of the two windings may be made exactly equal and in phase and the reactances of the two windings may be made exactly equal while the M. M. F. harmonic content of each winding may be reduced to give satisfactory machine performance whether the windings are paralleled or separately connected to loads which are markedly unequal.

4. A turbine generator stator double layer winding arrangement comprising two electrically independent two-pole three-phase windings arranged in the respective layers in slots in the stator core in phase belts each of which comprises three sub-phase belts assigned to the respective windings such that the arrangement of successive sub-phase belts is two slots assigned to one winding, three slots assigned to the other and two slots assigned to the first, with appropriate reversals between phase belts such that the voltage generated in corresponding phases of the two windings are equal in magnitude and in phase.

5. In combination, a generator stator core portion having winding slots, and arranged in layers in said slots the coil sides of a winding arrangement comprising two electrically independent polyphase windings, with the arrangement per layer comprising phase-belts corresponding in number to the product of the number of phases and the number of poles, said phase belts each having three sub-phase belts each comprising adjacent coil sides belonging to a single phase of a single winding, the arrangement being further characterized by each phase belt being split in a 2—3—2 arrangement with respect to the number of coil sides involved in the three sub-phase belts, said arrangement also comprising reversals throughout so that first one and then the other winding is assigned the three adjacent coil sides making up a sub-phase belt in the middle of a phase belt so that the generated voltages of the corresponding phases of the two windings will be equal and in phase.

6. A turbine generator stator two layer four pole winding arrangement having two electrically independent electrically and magnetically identical three phase armature windings, said arrangement for each layer comprising conductors arranged in said slots in twelve phase belts each comprising three sub-phase belts with the arrangement of conductors in adjacent slots for successive sub-phase belts of each layer being two of one of said windings, four of the other of said windings, and two of the first of said windings, with appropriate reversals such that the voltages produced in said windings may be identical in magnitude and in phase.

7. In combination, a generator stator core portion having winding slots, and arranged in layers in said slots the coil sides of a winding arrangement comprising two electrically independent windings, with the arrangement per layer comprising phase belts corresponding in number to the product of the number of phases and the number of poles, said phase belts each having three sub-phase belts each comprising adjacent conductors belonging to a single phase of a single winding, the arrangement being further characterized by each phase belt being split in a 2—4—2 arrangement with respect to the number of coil sides involved in the three sub-phase belts, said arrangement also comprising reversals every third phase belt with respect to the sub-phase belts of each phase belt assigned to a particular one of the two windings so that the generated voltages of corresponding phases of the two windings will be equal and in phase.

8. A winding arrangement for a double winding turbine generator stator, said arrangement being provided in slots of said stator, and said arrangement comprising phase belts at least half of which are characterized by being divided into three or more sub-phase belts assigned to the respective circuits with the sub-phase belts spanning unequal groups of adjacent slots.

9. For use in a dynamoelectric machine having a magnetic member provided with winding slots, a winding arrangement providing two electrically independent electrically and magnetically identical three phase armature windings, said arrangement comprising phase belts which are divided into an average of more than two sub-phase belts per phase belt, some of said sub-phase belts involving a different number of conductors than other of said sub-phase belts, and said sub-phase belts being assigned to the respective windings with suitable reversals between phase belts so that voltages of the two windings may be equal in magnitude and in phase.

10. In combination, a turbine generator stator core having winding slots, and arranged in two layers in said slots the coil sides of a winding arrangement comprising two electrically independent three-phase four-pole windings with the arrangement per layer comprising phase belts corresponding in number to the product of the number of phases and the number of poles, half of said phase belts comprising first phase belts each having coil sides arranged 3—3 in two subphase belts respectively assigned to the different windings, the other half of said phase belts comprising second phase belts interspersed between said first phase belts, each of said second phase belts having coil sides arranged 2—3—2 to form 3 sub-phase belts alternately assigned to the respective windings, said arrangement also comprising reversals throughout so that the generated voltages of the corresponding phases of the two windings will be equal and in phase.

11. In combination, a turbine generator stator core having winding slots, and arranged in two layers in said slots the coil sides of a winding arrangement comprising two electrically independent three-phase two-pole windings with the arrangement per layer comprising phase belts corresponding in number to the product of the number of phases and number of poles, each of said phase belts having coil sides arranged 1—3—3—1 to form four sub-phase belts alternately assigned to the respective windings with suitable reversals throughout so that the generated voltages of corresponding phases of the two windings will be exactly equal and in phase.

12. In combination, a turbine generator stator having winding slots and arranged in two layers in said slots the coil sides of a winding arrangement comprising two electrically independent electrically and magnetically identical three-phase four-pole windings with the arrangement per layer comprising phase belts corresponding in number to the product of the number of phases and number of poles, each of said phase belts having three sub-phase belts alternately assigned to the respective windings, and with a pattern of coil sides per phase belt of 2—4—2 in half of the phase belts and of 2—3—2 in the other half of the phase belts with the phase belts of said second half interspersed between the phase belts of said first half.

JOHN E. McELLIGOTT.
DEAN B. HARRINGTON.

REFERENCES CITED

The following references are of record in the file of this patent:

UNITED STATES PATENTS

| Number | Name | Date |
|---|---|---|
| 2,046,992 | Alger | July 7, 1936 |